Figure 1:
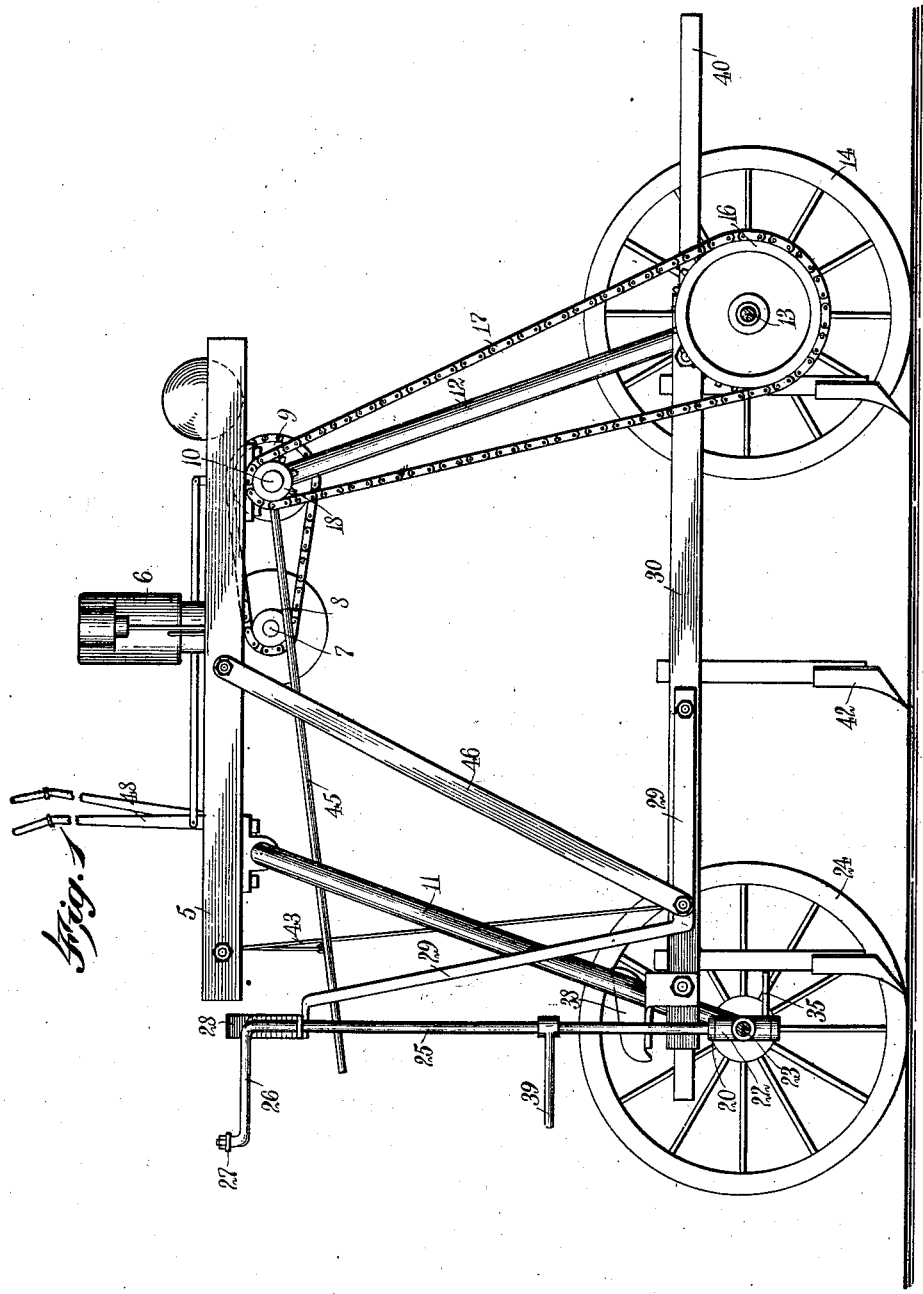

W. E. STANLEY.
AUTOMOBILE.
APPLICATION FILED DEC. 14, 1910.

1,028,975.

Patented June 11, 1912.
4 SHEETS—SHEET 3.

Fig. 3

WITNESSES:

INVENTOR
William E. Stanley
BY
ATTORNEYS

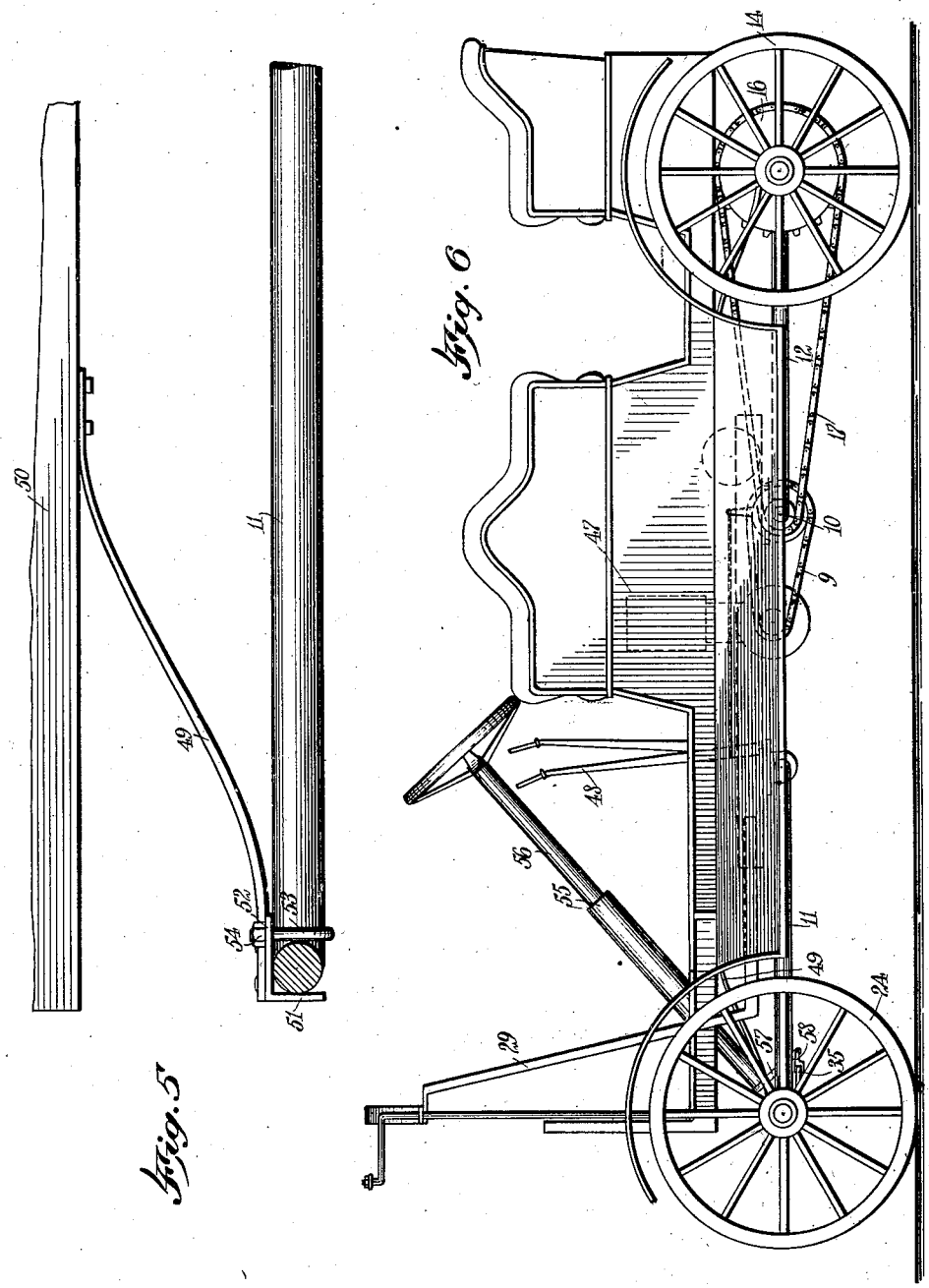

UNITED STATES PATENT OFFICE.

WILLIAM E. STANLEY, OF HAWKINSVILLE, GEORGIA.

AUTOMOBILE.

1,028,975. Specification of Letters Patent. Patented June 11, 1912.

Application filed December 14, 1910. Serial No. 597,209.

*To all whom it may concern:*

Be it known that I, WILLIAM E. STANLEY, a citizen of the United States, and a resident of Hawkinsville, in the county of Pulaski and State of Georgia, have invented a new and Improved Automobile, of which the following is a full, clear, and exact description.

My invention relates to automobiles, and it has for its object to provide one in which the frame carrying the motor may be raised a considerable distance above the ground and be supported in this position, so that plow shares or shovel members may be carried between the wheels and below the said frame, to work the soil as the automobile is driven by its motor. As the machine is constructed it may be readily converted from a pleasure vehicle to one carrying plow shares or shovels for working the soil, the central frame carrying the motor being raised high enough to permit the cultivation of tall crops.

Another object of the invention is to provide an automobile, to the main shaft or differential of which may be connected machinery to be driven by the automobile engine.

Additional objects of the invention will appear in the following complete specification, in which the preferred form of my invention is disclosed.

In the drawings, similar characters of reference indicate corresponding parts in all the views, in which—

Figure 2:
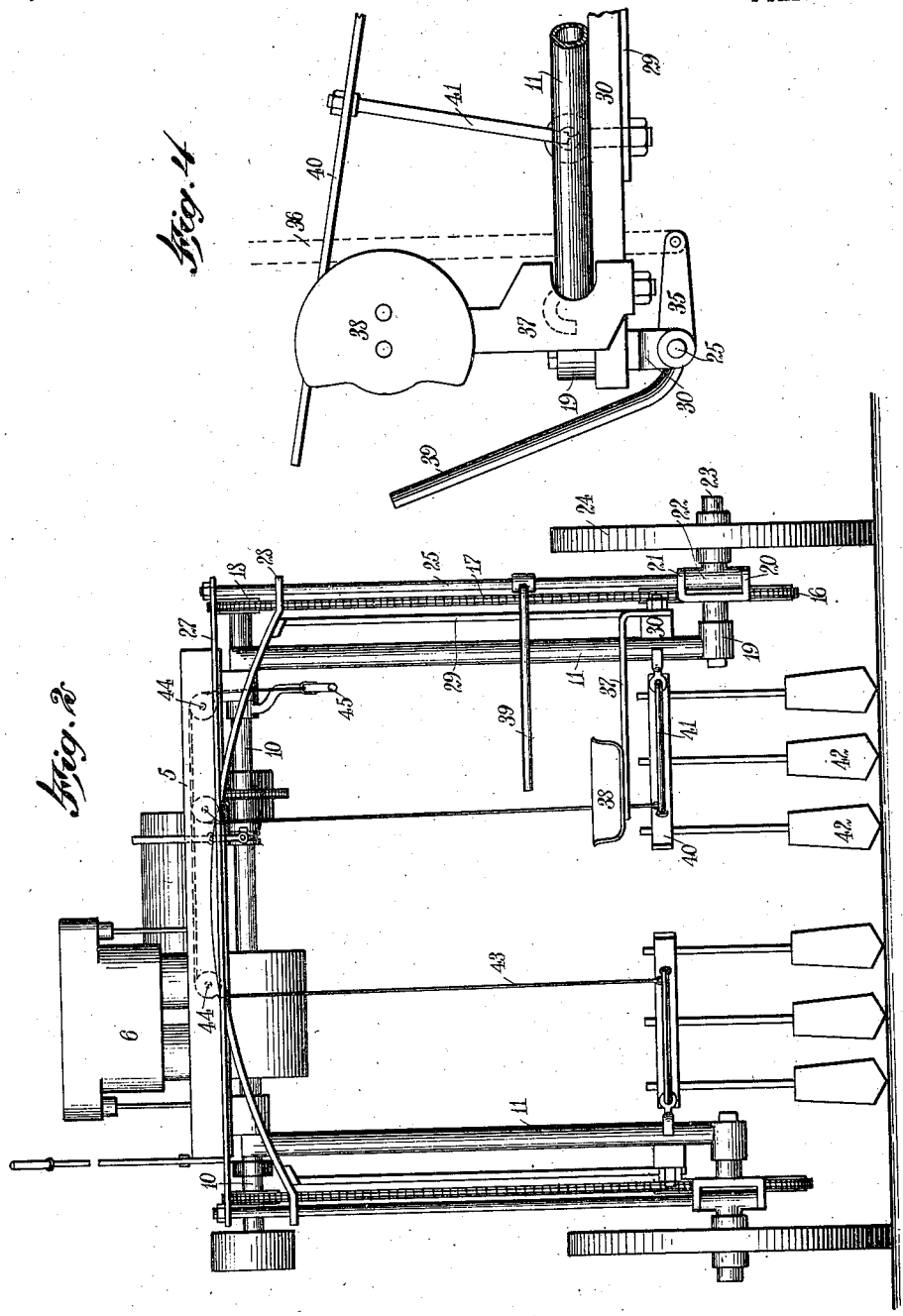
Figure 3:
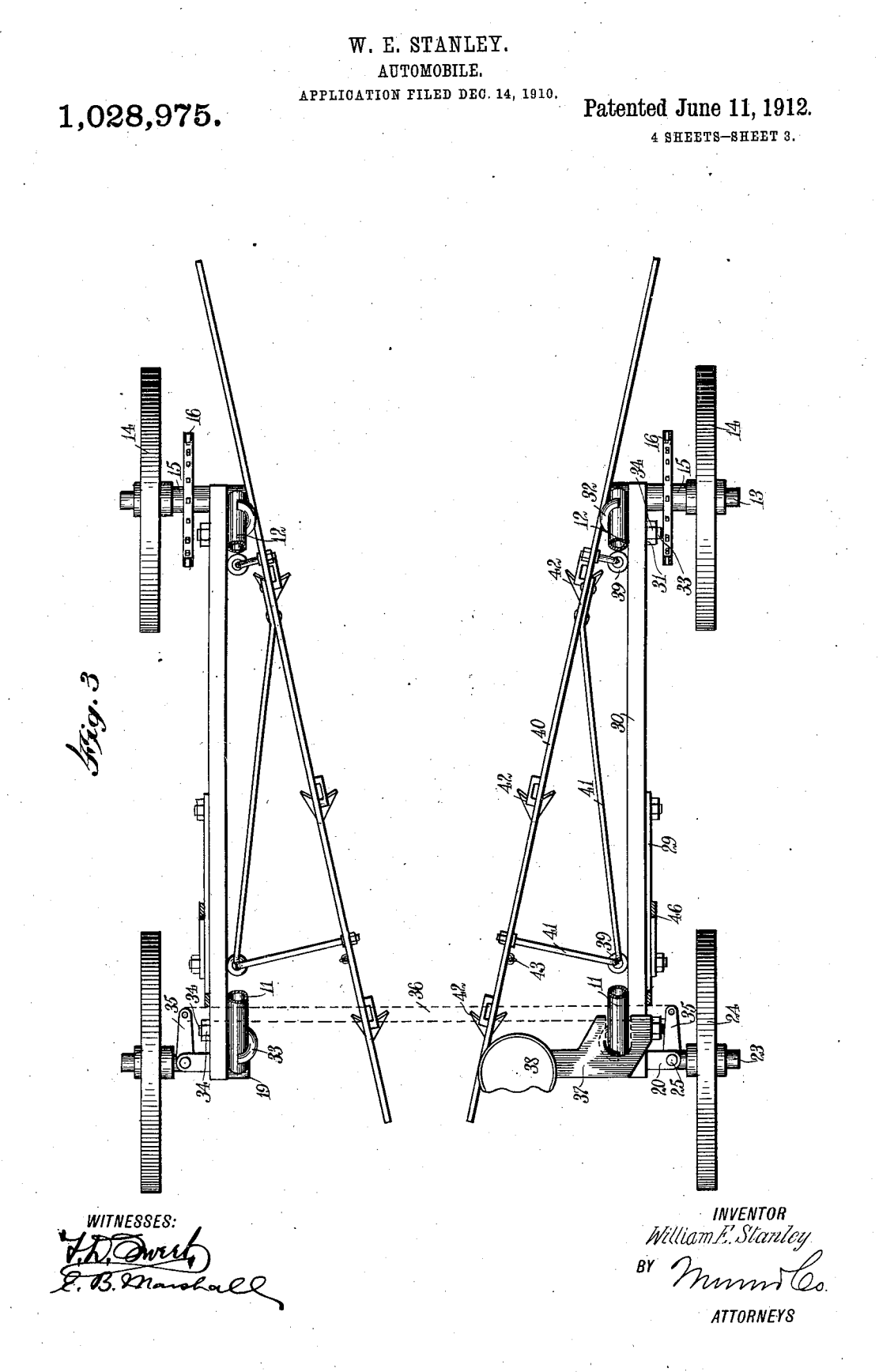

Figure 1 is a side elevation partially in section, of the automobile with its parts adjusted so that it may be used as a cultivator; Fig. 2 is a front elevation of Fig. 1; Fig. 3 is a sectional plan view of Fig. 1; Fig. 4 is a fragmentary view showing the method of mounting the steering lever shown in Fig. 1 of the drawings; Fig. 5 is a fragmentary sectional view showing the means of mounting the projecting spring members to the main frame and securing them to the legs; and Fig. 6 is a side elevation of my automobile provided with a carriage body.

By referring to the drawings it will be seen that a main frame 5 is provided on which is mounted a motor 6, having a shaft 7, and a pulley 8, the pulley 8 being connected with a pulley 9 secured to the differential shaft 10. To the front of the main frame 5 are pivoted two legs 11, two legs 12 being pivoted to the rear of the main frame 5, concentrically with the differential shaft 10. To the legs 12 are secured axles 13, on which are mounted wheels 14, the wheels 14 being connected by collars 15 with sprocket wheels 16, these sprocket wheels 16 being connected by sprocket chains 17 with sprocket wheels 18 on the differential shaft 10. The legs 11 have offset bearings 19 to which are pivoted brackets 20, having bearings 21, in which knuckles 22 are journaled, the shafts 23 being secured to the knuckles 22 and wheels 24 being mounted on said shafts. Rods 25 are secured to the knuckles 22, the rods 25 projecting upwardly, their upper terminals being bent forwardy as shown in Fig. 1 of the drawings. These upper terminals 26 of the rods 25 are connected by a cross bar 27. These rods 25 are disposed in openings in a guide member 28, this guide member 28 extending from one of the rods 25 to the other, and being supported on side members 29 which extend downwardly and rearwardly, the said side members 29 being secured to the side bars 30 when the machine is used for cultivating the soil. These side bars 30 have openings 31 in which are disposed hook members 32 with threaded terminals 33, which are engaged by the nuts 34. These hook members 32 engage the legs 11 and 12, respectively, and hold them in place relatively to the side bars 30. Rearwardly extending arms 35 are secured to the knuckles 22, these arms 35 being normally connected by a bar 36. Bolted to one of the side bars 30 there is an inwardly projecting member 37 to which is secured the seat 38. A lever 39 is secured to one of the rods 25, and extends inwardly so that it is within easy reach of the occupant of the seat 38. Inwardly extending eyes 39 are secured to the side bars 30, members 40 being articulated to the said eyes 39, at the rear of the machine. Members 41 are secured to the members 40 these members 41 being articulated to the eyes 39. To the members 40 are secured plow shares or shovel members 42, ropes 43 being secured to the members 40, the ropes 43 extending over pulleys 44 mounted on the main frame 5, the ropes 43 being led to a lever 45 which is fulcrumed to the differential shaft 10. This lever 45 extends forwardly and is within easy reach of the occupant of the machine.

When the machine is used for cultivating the soil, the motor 6 will drive the rear wheels 14 in a manner readily understood, and the plow shares or shovels 42 will work the soil as the machine is steered by the operator seated on the seat 28, who steers with the lever 39. The operator may readily raise the plow shares or shovel members 42 by drawing downwardly on the lever 45. As the frame 5 is disposed a considerable distance above the ground, it will be seen that it will not interfere with the operation of the machine, and that there will be considerable space between the side bars 30 and below the main frame 5. To assist in steadying the main frame 5 above the side bars 30, braces 46 are provided, which are secured at their upper terminals to the main frame 5 and at their lower terminals to the side bars 30.

Any suitable tires, brakes and speed gears may be used on the automobile, with ample power and transmission mechanism.

When it is desired to use the machine as a pleasure vehicle, the braces 46 are freed from the main frame 5, and the hooks 32 are freed from the legs 11 and 12 by means of loosening the nuts 34, the main frame being in the meantime supported by jacks or by tackle from above. The side bars having been freed from the legs 11 and 12 in the manner described, and also from the side members 29, the side bars are removed, carrying with them the members 39, 40, 41, 42, as well as the member 37 and the seat 38. The ropes 43 and the levers 45 are also removed. The main frame 5 is then lowered, the front legs 11 moving forwardly at their lower terminals, and the rear legs 12 moving rearwardly at their lower terminals. When the main frame 5 has been lowered so that the legs 11 and 12 are disposed substantially horizontally, the carriage body 47 is lowered by means of tackle to the position shown in Fig. 6 of the drawings, the levers 48 for operating the engine passing upwardly through openings in the floor of the carriage body, at the left side. There are two spring members 49 which are secured to the bottom of the frame 50 of the carriage, these spring members 49 extending forwardly. There are also two similar spring members 49 secured to the frame 50 of the carriage at the rear, these two additional spring members 49 extending rearwardly, the forwardly extending spring members 49 being connected by an angle member 51, this angle member 51 being disposed against the top and front of the bearings 19, the angle member 51 being provided with orifices 52, in which are disposed hook members 53, these hook members 53 engaging the legs 11 respectively, and being held in place by means of nuts 54, which engage threaded terminals of the hooks 53 and press against the angle member 51. The spring members 49 extending from the rear of the carriage body are also connected together by a similar angle member 51, which presses against the top and rear of the legs 12, where they are connected to the axles 13, similar hooks 53 being provided for engaging the said legs 12, the hooks being held in place in the manner described with reference to the hooks engaging the legs 11. The carriage body 47 having been bolted to the main frame 5, and as the legs 12 are pivoted concentrically with the differential shaft 10, the motor 6 is adapted to drive the rear wheels and propel the vehicle. It is therefore only necessary to provide steering means to complete the machine as a pleasure vehicle. To the inclined bearing 55 on the carriage body 47 there is journaled a shaft 56, to which is secured an arm 57, this arm 57 being connected by a link 58 with the bar 36, this bar 36 being articulated to the rearwardly-extending arms 35, which are secured to the knuckles 22.

It will be understood that not only may my machine be used for cultivating the fields and as a pleasure vehicle, but that the sprocket wheels 18 may be disconnected from the sprocket wheels 16, and be connected by the sprocket chain 17 or by other means with a gin or machinery which the farmer may desire to operate. If desired, the sprocket wheels 18 may be removed and pulleys be mounted on the shaft 10, to be connected by belts with the gin. The machine may be used for hauling any vehicle or machine. When the main frame 5 is raised, the machine is adapted to straddle. The machine may be used for plowing, planting, fertilizing, cutting grain or harvesting.

As the machine does away with the necessity of keeping horses on the farm, a farmer having one of my machines will not be obliged to grow crops for feed, thereby lessening the work on the farm.

It will be understood that when planters, fertilizer distributers and other machinery are attached to the automobile, it plows fertilizer and plants land all at the same time. It is also practicable to connect suitable machinery to the automobile, so that grain crops may be cut and the land be plowed and planted all at the same time. Inasmuch as the automobile may be driven continually and at a good speed, one person can cover a field of twenty acres in a day, reducing the cost of land and crop cultivation from two-thirds to three-fourths.

Having thus described my invention I claim as new and desire to secure by Letters Patent:

1. In an automobile a frame, legs pivoted to the frame, bearings mounted on the legs, knuckles having axles journaled in the bearings, wheels mounted on the axles respectively, means connected with the knuckles by which they may be moved simultaneously, additional means for supporting the frame, and means for holding the legs in a predetermined position relatively to the frame.

2. In an automobile a frame, legs pivoted to the front of the frame, legs pivoted to the rear of the frame, and detachable side bars connecting the legs at the front and rear of the frame respectively.

3. In an automobile a frame carrying a motor, legs pivoted at one end of the frame, legs pivoted at the other end of the frame, detachable side bars connecting the legs at one end of the frame with the legs at the other end of the frame respectively, wheels mounted on the legs, and means by which the motor is adapted to drive the wheels mounted on the legs at one end of the frame.

4. In an automobile a frame, legs having bearings pivoted at the front of the frame, legs pivoted at the rear of the frame, detachable means connecting the legs at the front and the rear of the frame respectively, brackets having bearings journaled in the first-mentioned bearings, knuckles having axles journaled in the second-mentioned bearings, wheels mounted on the axles, and wheels mounted on the second-mentioned legs.

5. In an automobile a frame, legs having bearings, pivoted at the front of the frame, legs pivoted at the rear of the frame, detachable side bars for connecting the front and rear legs, brackets having bearings journaled in the first-mentioned bearings, knuckles having axles journaled in the second-mentioned bearings, wheels mounted on the axles, and wheels mounted on the second-mentioned legs.

6. In an automobile a frame, legs having offset portions pivoted to the frame, detachable angle members having orifices disposed against the offset portions, detachable hooks disposed around the legs, disposed through the orifices, and secured to the angle members, and springs secured to the angle members.

7. In an automobile a frame, legs pivoted at the front of the frame, legs pivoted at the rear of the frame, a removable body normally secured to the frame, members secured to the body projecting forwardly, and detachably secured to the first-mentioned legs, a cross member connecting the first-mentioned members, members secured to the rear of the body and projecting rearwardly, and detachably secured to the second-mentioned legs, a second cross member connecting the last-mentioned members, and wheels mounted on the legs.

8. In an automobile, a frame, legs having offset portions pivoted to the frame, detachable angle members having orifices disposed against the offset portions, detachable hooks disposed around the legs, extending through the orifices and secured to the angle members, and supporting members secured to the angle members.

In testimony whereof I have signed my name to this specification in the presence of two subscribing witnesses.

WILLIAM E. STANLEY.

Witnesses:
R. A. PALE,
JNO. H. CALDWELL.